Jan. 25, 1949. K. J. CHASE 2,460,215
TELLTALE FOR FROZEN FOOD PACKAGES
Filed July 8, 1946
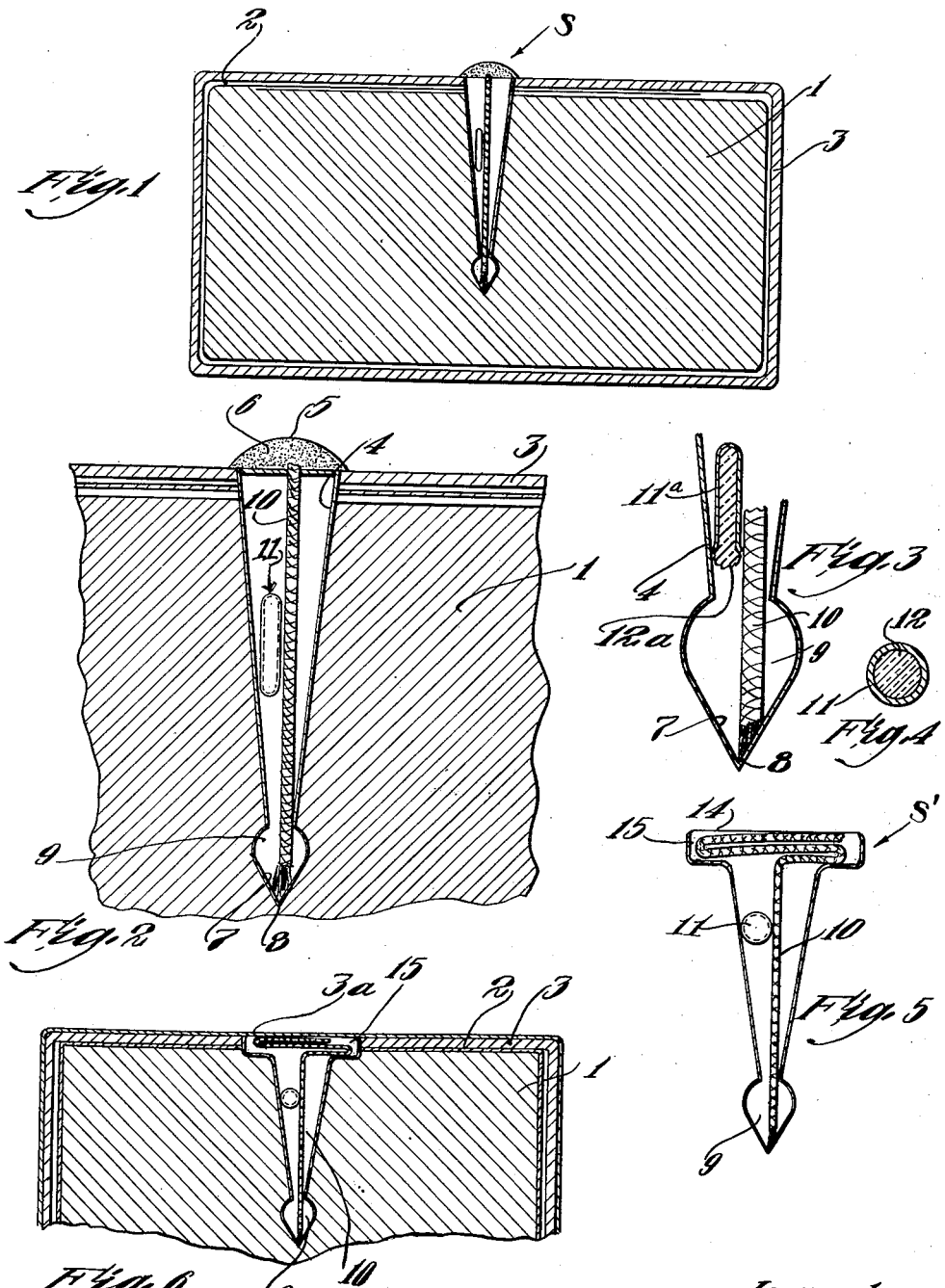
Inventor
Kenneth J. Chase
By Roberts Cushman & Grover
Attys.

Patented Jan. 25, 1949

2,460,215

UNITED STATES PATENT OFFICE 2,460,215

TELLTALE FOR FROZEN FOOD PACKAGES

Kenneth J. Chase, Wilmington, Mass.

Application July 8, 1946, Serial No. 682,101

14 Claims. (Cl. 99—192)

This invention pertains to quick frozen food products, and more especially to a warning or telltale device operative to inform the purchaser as to whether the food package has been thawed in the interval between its original quick freezing and the time of its purchase.

The peculiar value of the quick freezing process resides in the fact that food so prepared retains its natural color, flavor and texture, whereas slow freezing ordinarily destroys these characteristics. It is also to be noted that after quick frozen food has been thawed it tends to deteriorate quite rapidly and is susceptible to bacterial attack even more rapidly than fresh food.

In the interval between the production of the quick frozen package and its purchase by the consumer, the package should be kept constantly below the freezing temperature, but it sometimes happens, through accident or carelessness, that the package is exposed during this interval to the thawing temperature, after which it is again frozen. However, such refreezing is usually slow and the resultant package no longer possesses the characteristics of quick frozen food. Moreover, if the package remain in the thawed condition for a substantial time before refreezing, bacterial deterioration may occur to an extent such that the user of the product may be made ill by eating the food.

Attempts have heretofore been made to provide warning or telltale devices for quick frozen food packages designed to apprise the purchaser of the fact that a thawing of the package has occurred intermediate its preparation and the time of purchase, but all such prior warning or telltale devices, so far as they are known to me, respond to even a very slight surface thawing of the package. However, slight surface melting is not necessarily injurious to the package contents as a whole, and thus these prior warning devices may indicate that the package has deteriorated and become worthless, whereas only a surface film has melted, for example by a short exposure to atmospheric temperature as the result of the opening of a sales cabinet.

The principal object of the present invention is to provide a warning or telltale device for a quick frozen food package which does not respond to mere surface thawing, but which only acts when the package as a whole begins to soften. A further object is to provide a warning device which is inserted into the package prior to or during freezing, and which penetrates into the mid-portion of the package, and which is firmly held in place by the freezing of the material. A further object is to provide a warning device of the class described which is cheap to make and install, and which does not mix with the frozen material when the latter is thawed nor utilize any part of the food itself as an activating agent. Other and further objects and advantages of the invention will be pointed out in the following more detailed description, and by reference to the accompanying drawings wherein:

Fig. 1 is a diagrammatic transverse section through a conventional food package showing the warning device of the present invention installed therein;

Fig. 2 is a fragmentary view similar to Fig. 1, but showing the warning device to larger scale;

Fig. 3 is a fragmentary transverse section, to larger scale than Fig. 2, showing the lower or inner end of the warning device as it appears after the first freezing has taken place;

Fig. 4 is a diametrical section through a water capsule which forms a part of the warning device;

Fig. 5 is a vertical section through a warning device of a slightly modified form; and Fig. 6 is a view similar to Fig. 1 but showing the warning device of Fig. 5 installed in the package.

Referring to the drawings the numeral 1 designates a mass of quick frozen food wrapped in the usual manner in moisture-resistant or parchment paper 2 and enclosed in an outer box or container 3 of cardboard in accordance with the conventional mode of preparing frozen food for sale.

In accordance with the present invention, this package is provided with a signal device S comprising an elongate casing or housing 4 preferably having thin walls of a material, for instance one of the hard synthetic resins, this housing being moisture impervious and of a length such that when its outer end is substantially flush with the outer surface of the package, the inner end of the housing is disposed within the food mass 1, for example, substantially at the mid-portion of the food mass. This casing 4 is provided at its upper or outer end with a closure member 5 of light-transmitting, preferably transparent material, making a water-tight joint with the side walls of the housing. If desired, the entire casing may be of the same material, but in any event, its upper or outer end should form a window through which the color of the contents of the member 5 may be seen. As illustrated in Figs. 1 and 2 this closure member is upwardly convex and defines a chamber at the outer end of the casing which houses a mass of signaling material 6, for instance a normally dry powder whose color changes to a marked degree when the powder is moistened. An example of such powder may be mentioned, without limitation, potassium permanganate, which when dry is a dark dull brown, but which becomes a vivid purple when wet; anhydrous copper sulphate which is greenish-white when dry but bright blue when wet.

The opposite or inner end portion of the casing is preferably substantially acorn shaped as illustrated in Figs. 1, 2 and 3, forming a tapering bulb having the downwardly convergent conical wall 7 terminating in a penetrating point 8, the bulb defining a chamber 9 at the inner end of the casing. A conductor 10 for moisture extends from the chamber 9 to the interior of the closure member 5 containing the signal material 6. This conductor 10 may be a capillary tube but preferably is a moisture-absorbent wick designed to transmit moisture by capillary action from the chamber 9 to the signaling means 6.

The chamber 9 also initially houses a hollow capsule 11, for instance a sphere of a thin inelastic plastic which is initially filled with water.

Before the food mass 1 is subjected to the quick freezing process, the signal device is thrust down into the package, the point 8 permitting the signal device as a whole to be pushed through the paper wrapper 2 and into the mass of unfrozen material. During the quick-freezing operation, the temperature within the chamber 9 of the casing drops well below the freezing temperature of water, and as the water 12 in the capsule 11 freezes, it expands and bursts the capsule as shown in Fig. 3, thus exposing a small mass 12ª of ice within the chamber 9.

When the food package is thawed, either purposely or accidentally, the temperature surrounding the bulb 9 rises until the mass 12ª of ice is melted. The water thus supplied moistens the wick 10 and is conducted by the latter up to the signal material 6. As soon as the latter is moistened its color changes and remains permanently changed so that anyone observing this material 6 through the window 5 is notified of the fact that the temperature at the interior of the package has risen, since the quick-freezing operation, to the melting point. Subsequent refreezing of the package will not restore the color of the signal means 6 to its original color, and thus the would-be purchaser is given adequate notice if the package has been thawed and refrozen since the quick-freezing operation.

A slight modification is illustrated in Figs. 5 and 6 wherein the signal device S' is provided with a casing, generally similar to that above described, having a substantially flat transparent wall or window 14 at its upper end and a chamber 15 in which is coiled the upper part of the wick 10. In this instance the wick itself is initially impregnated with a substance whose color will change and remain permanently changed when moistened. For example, the wick may be impregnated with alkaline phenol phthalate and dried, having then no appreciable color, but when wet, becoming bright red. Alternatively, the wick may be impregnated with litmus, and the capsule 11 may contain an alkaline or acid water solution, so that when released and wetted, it will change the color of the wick. In other respects the device is similar to that above described, the lower end having the chamber 9 which initially houses the liquid-receiving capsule 11. When the ice released from the capsule becomes liquid it moistens the wick and the color of the entire wick, including the coils in the chamber 15, is permanently changed, thus providing the desired signal. In Fig. 6 the cardboard box or housing 3 is shown as having an outer wrapper 3ª of waxed paper which is sufficiently transparent to permit the signal to be seen, the top of the casing being located substantially flush with the upper surface of the cardboard box.

By forming the signal device with a downward taper it is easy to thrust it into the mass of food even though the latter be quite compact. Furthermore by shaping the inner end of the casing to form a tapering bulb, the penetration of the casing into the food is facilitated while the shoulder formed by the upper part of the bulb constitutes anchoring means which firmly holds the signal device within the mass of frozen material after freezing. However, the exact shaping of the housing is not essential to the broad aspects of the invention.

While certain desirable embodiments of the invention have been illustrated by way of example, it is to be understood that the invention is broadly inclusive of any and all modifications falling within the scope of the appended claims.

I claim:

1. A warning device for a quick-frozen food package comprising a fluid-tight elongate casing having an outer portion designed to be located adjacent to an outer surface of the package, and an inner portion designed to be located deep within the package, fluid-activated signal material within the outer part of the casing, said signal material being of a kind which is permanently changed in appearance by contact with a selected fluid, a fluid conductor extending from the inner part of the casing to the outer part thereof, and means in the inner portion of the casing operative to supply fluid, operative to change the appearance of the signal material, to the conductor when the temperature of the interior of the previously frozen package rises above the freezing point.

2. A warning device for a quick-frozen food package comprising a fluid-tight elongate casing having an outer portion designed to be located adjacent to an outer surface of the package, and an inner portion designed to be located deep within the package, fluid-activated signal material in the outer part of the casing, a conductor for the fluid extending from the inner part to the outer part of the casing, and a frangible capsule containing liquid located at the inner part of the casing, said capsule being designed to rupture in freezing and thereby to supply signal-activating fluid to the conductor when the temperature of the interior of the package thereafter rises above the freezing point.

3. A warning device for a quick-frozen food package comprising a fluid-tight elongate casing having an outer portion designed to be located adjacent to an outer surface of the package, and an inner portion designed to be located deep within the package, a signal substance within the outer end of the casing whose color changes when it is wet, a wick extending from the inner end of the casing to the outer end and which is operative to convey moisture to the signal substance, and means within the casing operative to supply moisture to the inner end of the wick when the temperature of the interior of the previously frozen package rises above the freezing point.

4. A warning device for a quick-frozen food package comprising a fluid-tight elongate casing having an outer portion designed to be located adjacent to an outer surface of the package, and an inner portion designed to be located deep within the package, a wick extending from the inner end of the casing to its outer end, a portion of the wick being visible at the outer end of the casing, the wick comprising a substance whose color changes when it is moistened, and means within the casing operative to supply moisture to the inner end of the wick when the temperature of the previously frozen package rises above the freezing point.

5. A warning device for use with a quick-frozen food package comprising a substantially rigid thin-walled elongate casing of light-transmitting moisture-impervious material, the casing having at its outer end a chamber for the reception of signal means, signal material, which changes color when moistened, within said chamber, the casing also having a chamber at its inner end, and an initially closed vessel containing water located in said latter chamber, said water-containing vessel being of a material which ruptures in response to the freezing of the water, and means for conducting moisture from the inner chamber to the outer chamber when the temperature of the inner chamber rises above the freezing point after the water vessel has been ruptured by previous freezing.

6. A warning device for use with a quick-frozen food package comprising a substantially rigid thin-walled elongate casing of light-transmitting moisture-impervious material, the casing having at its outer end a chamber for the reception of signal material, signal material, which changes color when moistened, within said chamber, the casing also having a chamber at its inner end, and a capsule containing a fluid which expands when cooled to a temperature approximating that of the normal temperature of the quick-frozen package and which is located within the second chamber, said fluid-containing vessel being of a material which ruptures in response to the expansion of said fluid in freezing, and an absorbent wick for conducting fluid from said inner chamber to the outer chamber when the temperature of the inner chamber rises above the freezing point of said fluid after the fluid-containing vessel has been ruptured by previous freezing.

7. A warning device for a quick-frozen food package comprising a substantially rigid thin-walled elongate casing of moisture-impervious material, said casing having a chamber in its outer end whose top wall is of light-transmitting material, a wick extending from said chamber substantially to the inner end of the casing, a closed capsule within the latter end of the casing, said capsule containing liquid which expands and ruptures the capsule when the temperature drops below the freezing point of the liquid, and signal material within said chamber which changes color when moistened by the capillary transmission of the liquid along the wick from the inner end of the casing to said chamber.

8. In combination in a quick-frozen food package a moisture-impervious hollow housing which extends from one face of the package deep into its interior, said housing having a window at its outer end, signal means within the housing arranged to be visible through the window, said signal means being of a kind which is permanently changed in color by the action of moisture and means within the housing operative to supply activating moisture to the signal means only when the temperature of the interior of the previously frozen package rises above freezing.

9. In combination in a quick-frozen food package a rigid moisture-impervious housing extending from one face of the package deep into its interior, the housing having a window at its outer end, moisture activated signal material within the housing and visible through the window, said signal material being of a kind which is permanently changed in visual appearance when moistened and means within the housing operative to supply moisture to the signal material only when the temperature of the interior of the previously frozen package rises above freezing.

10. In combination in a quick-frozen food package a rigid elongate hollow moisture-impervious housing extending from one exterior face of the package deep into its interior, said housing having a window at its outer end, a body of signal material disposed within the outer end portion of the housing where it is visible through the window, said signal material being of a kind which permanently changes color when moistened and a mass of ice within the inner portion of the housing the ice melting when the temperature of the interior of the previously frozen food rises above freezing thereby supplying moisture for activating the signal means.

11. A warning device for a frozen food package said device comprising a rigid elongate hollow moisture-impervious casing having a window at its outer end, signal means within the casing and visible through said window, said signal means being of a kind which permanently changes in color when moistened and means within the casing operative to supply moisture to the signal means only when the temperature of the inner end portion of the casing rises above freezing after having been cooled below freezing.

12. A warning device for a quick-frozen food package, said device comprising a elongate rigid moisture-proof housing pointed at one end to facilitate thrusting it into the food package and having a window at its opposite end, a moisture responsive signal element within the housing and visible through said window said signal element being of a kind which permanently changes in visual appearance when moistened and means within the housing operative to supply activating moisture to the signal element said moisture supplying means being inoperative until it has first been subjected to freezing temperature and subsequently thawed.

13. A warning device for a quick-frozen food package, said device comprising a rigid elongate moisture-impervious housing, one end of the housing being pointed to facilitate thrusting the housing into the package, the opposite end of the housing being shaped to provide a chamber for signal means and having a window through which the signal means may be observed, said latter end of the housing having a substantially flat surface designed to be flush with the outer face of the package, and a frangible capsule within the housing, said capsule being filled with water and when subjected to freezing temperature breaking to expose the body of ice within it.

14. A warning device for a quick-frozen food package, comprising a rigid elongate hollow casing having a tapering bulb at one end which terminates in a penetrating point, the casing having a chamber at its opposite end containing signal means of a kind which permanently changes color when moistened, the wall of the chamber having a window therein, said window being so located relatively to the signal means that change in color of the signal means may be observed through the window, and means within the casing which is responsive only to freezing followed by thawing to activate the signal means.

KENNETH J. CHASE.

REFERENCES CITED

The following references are of record in the file of this patent:

UNITED STATES PATENTS

| Number | Name | Date |
|---|---|---|
| 339,176 | Hempel | Apr. 6, 1886 |
| 945,978 | Nielsen et al. | Jan. 11, 1910 |
| 1,509,110 | Potter | Sept. 23, 1924 |
| 1,535,536 | McDonald | Apr. 28, 1925 |
| 1,779,066 | Halsey | Oct. 21, 1930 |
| 1,843,234 | Karnes et al. | Feb. 2, 1932 |
| 2,046,863 | Allphin | July 7, 1936 |
| 2,118,144 | Berman et al. | May 24, 1938 |
| 2,189,982 | Haglund | Feb. 13, 1940 |
| 2,277,278 | Triplett | Mar. 24, 1942 |